United States Patent
Kato et al.

(10) Patent No.: US 9,846,823 B2
(45) Date of Patent: Dec. 19, 2017

(54) TRAFFIC LANE BOUNDARY LINE EXTRACTION APPARATUS AND METHOD OF EXTRACTING TRAFFIC LANE BOUNDARY LINE

(71) Applicant: FUJITSU LIMITED, Kawasaki-shi, Kanagawa (JP)

(72) Inventors: Tetsuhiro Kato, Yokohama (JP); Osafumi Nakayama, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 110 days.

(21) Appl. No.: 14/721,534

(22) Filed: May 26, 2015

(65) Prior Publication Data

US 2015/0363668 A1 Dec. 17, 2015

(30) Foreign Application Priority Data

Jun. 13, 2014 (JP) ................................. 2014-122214

(51) Int. Cl.
- G06K 9/00 (2006.01)
- G06K 9/62 (2006.01)
- G08G 1/16 (2006.01)

(52) U.S. Cl.
CPC ......... G06K 9/629 (2013.01); G06K 9/00798 (2013.01); G08G 1/167 (2013.01)

(58) Field of Classification Search
CPC ...... B42D 25/29; B42D 25/328; D21H 21/44; D21H 21/48; G06K 9/00798; G06K 9/629; G08G 1/167
See application file for complete search history.

(56) References Cited

U.S. PATENT DOCUMENTS

| 2003/0069695 A1* | 4/2003 | Imanishi ................. B60R 1/00 701/301 |
| 2004/0042638 A1* | 3/2004 | Iwano ................. G06K 9/00798 382/104 |

(Continued)

FOREIGN PATENT DOCUMENTS

| EP | 1 221 643 A2 | 7/2002 |
| EP | 2 629 243 A1 | 8/2013 |

(Continued)

OTHER PUBLICATIONS

Extended European Search Report dated Nov. 4, 2015 in corresponding European Patent Application No. 15170062.2.

(Continued)

Primary Examiner — Manuchehr Rahmjoo
(74) Attorney, Agent, or Firm — Staas & Halsey LLP

(57) ABSTRACT

A traffic lane boundary line extraction apparatus includes: an image-data-acquiring-unit configured to acquire vehicle outside image data captured by a travelling vehicle; a candidate-area-detection-unit configured to detect a candidate area of a traffic lane boundary line from a road surface part of the vehicle outside image data; a road-surface-area-setting-unit configured to set a road surface area corresponding to the candidate area in the road surface part of the vehicle outside image data for each of the candidate area; a luminance-calculation-unit configured to calculate a representative luminance of the candidate area, and a representative luminance of the road surface area; and if a difference between the representative luminance of the candidate area and the representative luminance of the road surface area is greater than a predetermined threshold value, a candidate area evaluation unit configured to evaluate that the candidate area is suitable for the traffic lane boundary line.

10 Claims, 12 Drawing Sheets

(56) References Cited

U.S. PATENT DOCUMENTS

| | | | |
|---|---|---|---|
| 2004/0091133 A1* | 5/2004 | Monji | G06K 9/00798 |
| | | | 382/104 |
| 2005/0169501 A1 | 8/2005 | Fujii et al. | |
| 2010/0259617 A1 | 10/2010 | Kawasaki et al. | |
| 2011/0052079 A1 | 3/2011 | Tamura | |
| 2013/0208945 A1 | 8/2013 | Nunn et al. | |
| 2015/0317526 A1* | 11/2015 | Muramatsu | G06K 9/00812 |
| | | | 348/148 |

FOREIGN PATENT DOCUMENTS

| | | |
|---|---|---|
| EP | 2 927 060 A1 | 10/2015 |
| JP | 8-272933 | 10/1996 |
| JP | 10-11582 | 1/1998 |
| JP | 2005-215985 | 8/2005 |
| JP | 2010-244456 | 10/2010 |
| JP | 2011-53809 | 3/2011 |
| JP | 2011-118509 | 6/2011 |
| WO | 2014/084118 A1 | 6/2014 |

OTHER PUBLICATIONS

Extended European Search Report issued Nov. 4, 2015 in corresponding European Patent Application No. 15170062.2.

* cited by examiner

TRAFFIC LANE BOUNDARY LINE EXTRACTION APPARATUS AND METHOD OF EXTRACTING TRAFFIC LANE BOUNDARY LINE

CROSS-REFERENCE TO RELATED APPLICATION

This application is based upon and claims the benefit of priority of the prior Japanese Patent Application No. 2014-122214, filed on Jun. 13, 2014, the entire contents of which are incorporated herein by reference.

FIELD

The embodiments discussed herein are related to a traffic lane boundary line extraction apparatus and a method of extracting a traffic lane boundary line.

BACKGROUND

A lane departure warning apparatus mounted on a vehicle issues a warning when the travelling vehicle is about to depart from a lane without intentional operation by a driver. In this lane departure warning apparatus, a determination is made of whether the vehicle is going to depart from a lane or not based on the distance between the vehicle and a traffic lane boundary line extracted from a vehicle outside image in a vehicle travelling direction.

A traffic lane boundary line in a vehicle outside image is extracted by a traffic lane boundary line extraction apparatus (hereinafter also referred to simply as an "extraction apparatus").

In the traffic lane boundary line extraction apparatus, a traffic lane boundary line is extracted based on a change pattern, or the like of luminance values in a pixel line disposed in a horizontal direction in a vehicle outside image. Accordingly, an area on the road surrounded by shadows of power lines, and the like, which is irrelevant to a traffic lane boundary line, but has the same change pattern of luminance values as that of a traffic lane boundary line, is sometimes extracted as a traffic lane boundary line.

In order to avoid such mistaken extraction of a traffic lane boundary line, a proposal has given of an extraction apparatus that extracts a candidate area that corresponds to a traffic lane boundary line based on the difference in luminance between a candidate area of a traffic lane boundary line detected from the vehicle outside image, and a road surface area in the vehicle outside image.

In an extraction apparatus of this kind, a candidate area located on the right side of the vehicle in the vehicle travelling direction, and a candidate area located on the left side are combined into one pair, and a road surface area is set to an area located between the one pair of candidate areas (for example, refer to Japanese Laid-open Patent Publication No. 2010-244456).

In the above-described extraction apparatus, a road surface area is set to an area located between a candidate area located on the right side of the vehicle and a candidate area located on the left side of the vehicle. Thus, when the detected candidate area is located on only either one of the right side of the vehicle and the left side of the vehicle, it is not possible to set a road surface area. Accordingly, when a traffic lane boundary line exists on one side of the traffic lane, even if the above-described extraction apparatus extracts a candidate area corresponding to the traffic lane boundary line, it is not possible for the extraction apparatus to extract it as a traffic lane boundary line.

SUMMARY

According to an aspect of the invention, a traffic lane boundary line extraction apparatus includes: an image-data-acquiring-unit configured to acquire vehicle outside image data captured by a travelling vehicle; a candidate-area-detection-unit configured to detect a candidate area of a traffic lane boundary line from a road surface part of the vehicle outside image data; a road-surface-area-setting-unit configured to set a road surface area corresponding to the candidate area in the road surface part of the vehicle outside image data for each of the candidate area; a luminance-calculation-unit configured to calculate a representative luminance of the candidate area, and a representative luminance of the road surface area; and if a difference between the representative luminance of the candidate area and the representative luminance of the road surface area is greater than a predetermined threshold value, a candidate area evaluation unit configured to evaluate that the candidate area is suitable for the traffic lane boundary line.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, a detailed description will be given of embodiments of the present disclosure with reference to the drawings.

First Embodiment

Figure 1:
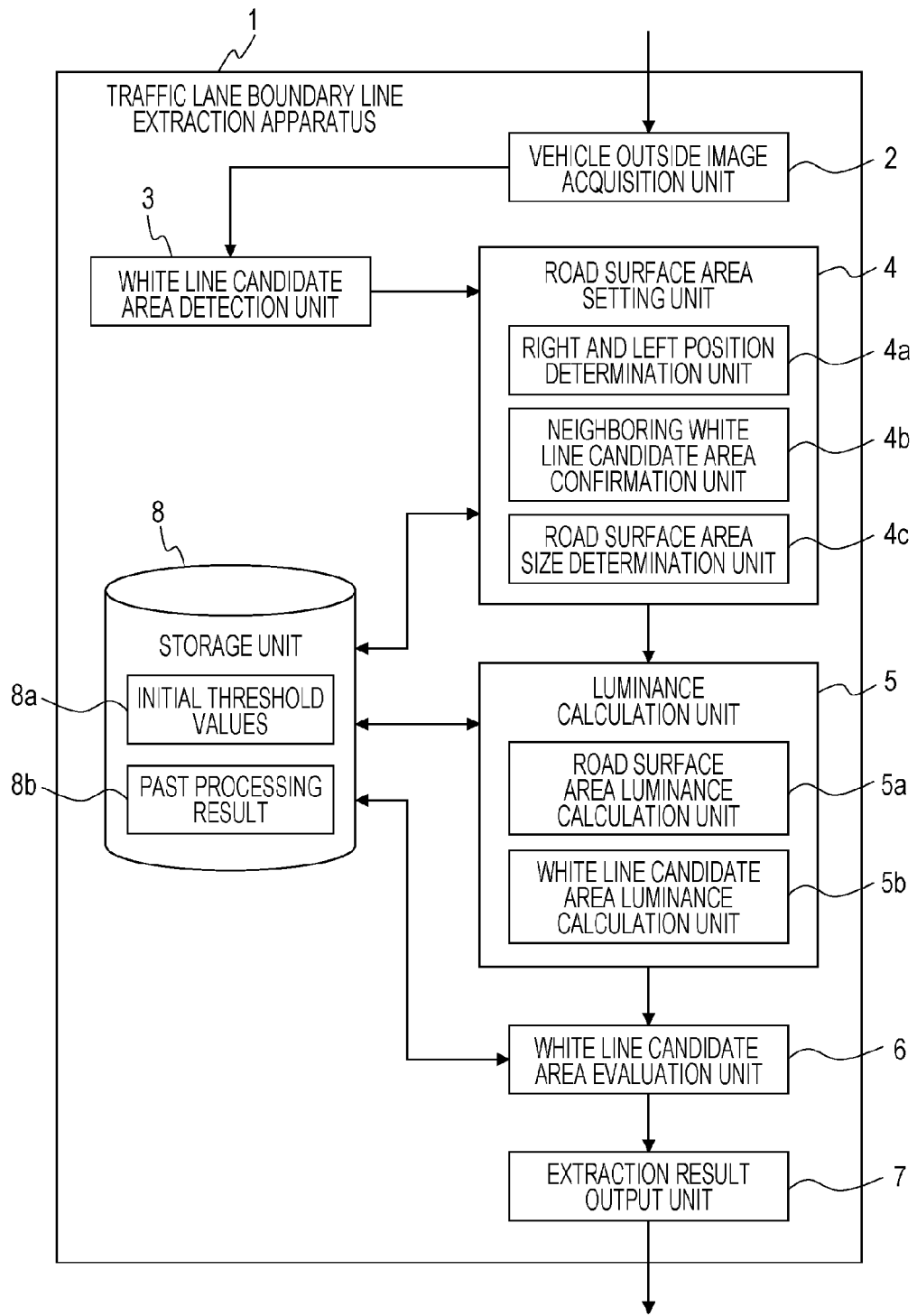
FIG. 1 is a functional block diagram illustrating a configuration of a traffic lane boundary line extraction apparatus according to a first embodiment of the present disclosure.

FIG. 1 is a functional block diagram illustrating a configuration of a traffic lane boundary line extraction apparatus according to a first embodiment of the present disclosure.

As illustrated in FIG. 1, a traffic lane boundary line extraction apparatus 1 according to the first embodiment includes a vehicle outside image acquisition unit 2, a white line candidate area detection unit 3, a road surface area setting unit 4, a luminance value calculation unit 5, a white line candidate area evaluation unit 6, an extraction result output unit 7, and a storage unit 8.

The vehicle outside image acquisition unit 2 obtains digital data of vehicle outside images or vehicle outside video (hereinafter referred to as "vehicle outside image data" together). The vehicle outside image data obtained by the vehicle outside image acquisition unit 2 is captured such that an image of the outside of the vehicle in the vehicle travelling direction side including a road surface is obtained.

The white line candidate area detection unit 3 detects a candidate area (hereinafter referred to as a "white line candidate area") of a traffic lane boundary line from the obtained vehicle outside image data.

The road surface area setting unit 4 sets a road surface area in a road surface part of the vehicle outside image data. The road surface area is an area in which validity of a white line candidate area is evaluated, and is set for each of the detected white line candidate areas. The road surface area setting unit 4 includes a right or left position determination unit 4a, a neighboring white line candidate area confirmation unit 4b, and a road surface area size determination unit 4c. The right or left position determination unit 4a determines on which of the right side and the left side of the vehicle in the vehicle travelling direction, the detected white line candidate area is located. The neighboring white line candidate area confirmation unit 4b confirms whether another white line candidate area exists on the adjacent inside (the side of the vehicle) of the white line candidate area or not. The road surface area size determination unit 4c determines the position and the size (width) of the road surface area based on the confirmation result by the neighboring white line candidate area confirmation unit 4b.

The luminance calculation unit 5 calculates the representative luminance of the road surface area, and the representative luminance of the white line candidate area. The luminance calculation unit 5 includes a road surface area luminance calculation unit 5a, and a white line candidate area luminance calculation unit 5b. The road surface area luminance calculation unit 5a calculates the representative luminance of the road surface area based on the luminance value of each pixel in the road surface area. The white line candidate area luminance calculation unit 5b calculates the representative luminance of the white line candidate area based on the luminance value of each pixel in the white line candidate area.

The white line candidate area evaluation unit 6 evaluates whether the white line candidate area is suitable for a traffic lane boundary line based on the representative luminance of the road surface area, and the representative luminance of the white line candidate area, and extracts only the white line candidate area suitable for a traffic lane boundary line as a white line area (traffic lane boundary line).

The extraction result output unit 7 associates the white line area data including the positional information of the extracted white line area with the vehicle outside image data, and outputs the white line area data to the outside of the traffic lane boundary line extraction apparatus 1.

The storage unit 8 stores initial threshold values 8a, a past processing result 8b, and the like. The initial threshold values 8a are initial values of the threshold values to be used for the processing performed by the road surface area setting unit 4, and the processing performed by the white line candidate area evaluation unit 6. The past processing result 8b is data including the positional information of the white line area, the representative luminance of the road surface area, the representative luminance of the white line candidate area, and the like in the vehicle outside image data having already been subjected to extraction of the white line area (traffic lane boundary line).

Figure 2:
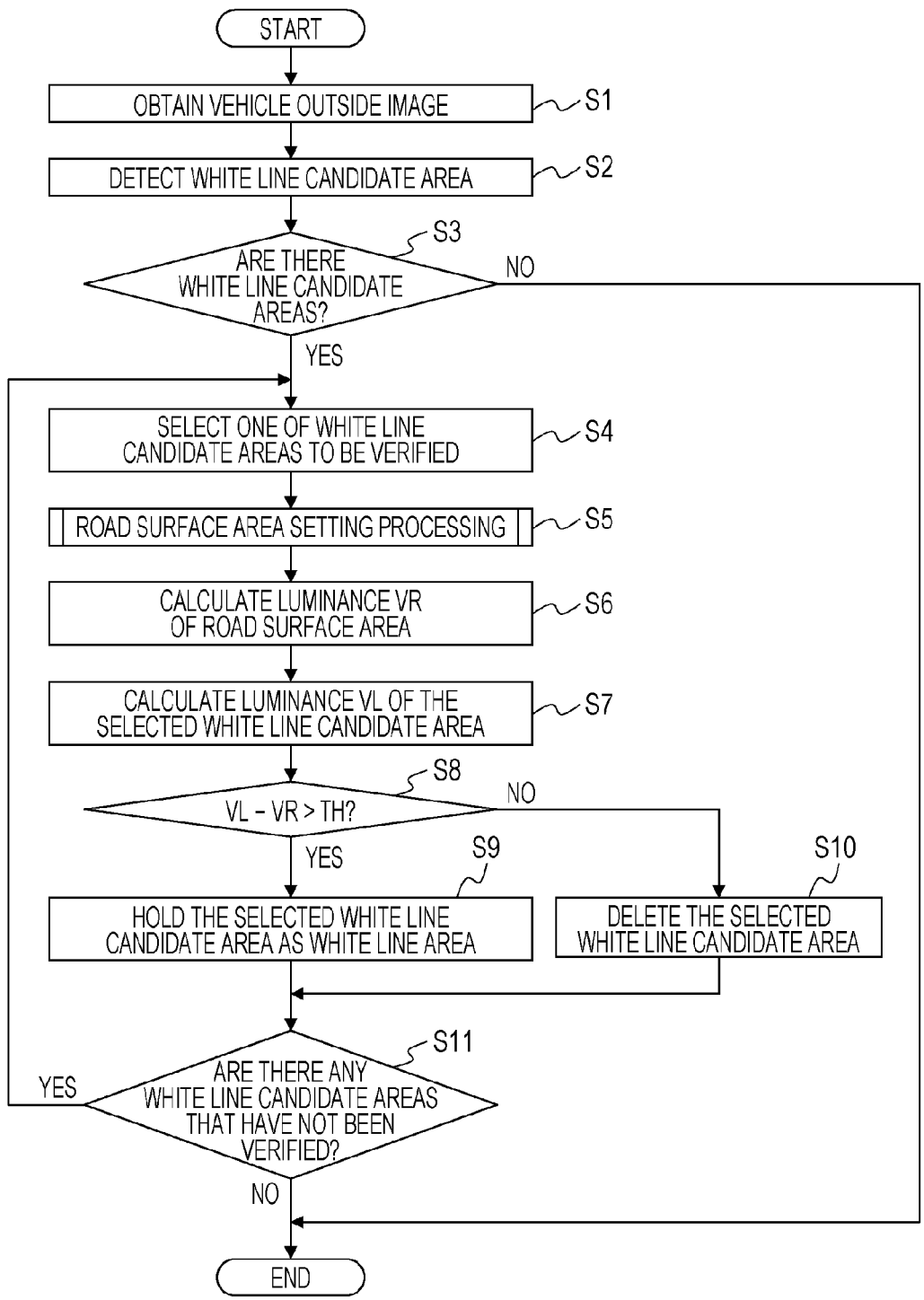
FIG. 2 is a flowchart illustrating a procedure of traffic lane boundary line extraction processing.
Figure 3:
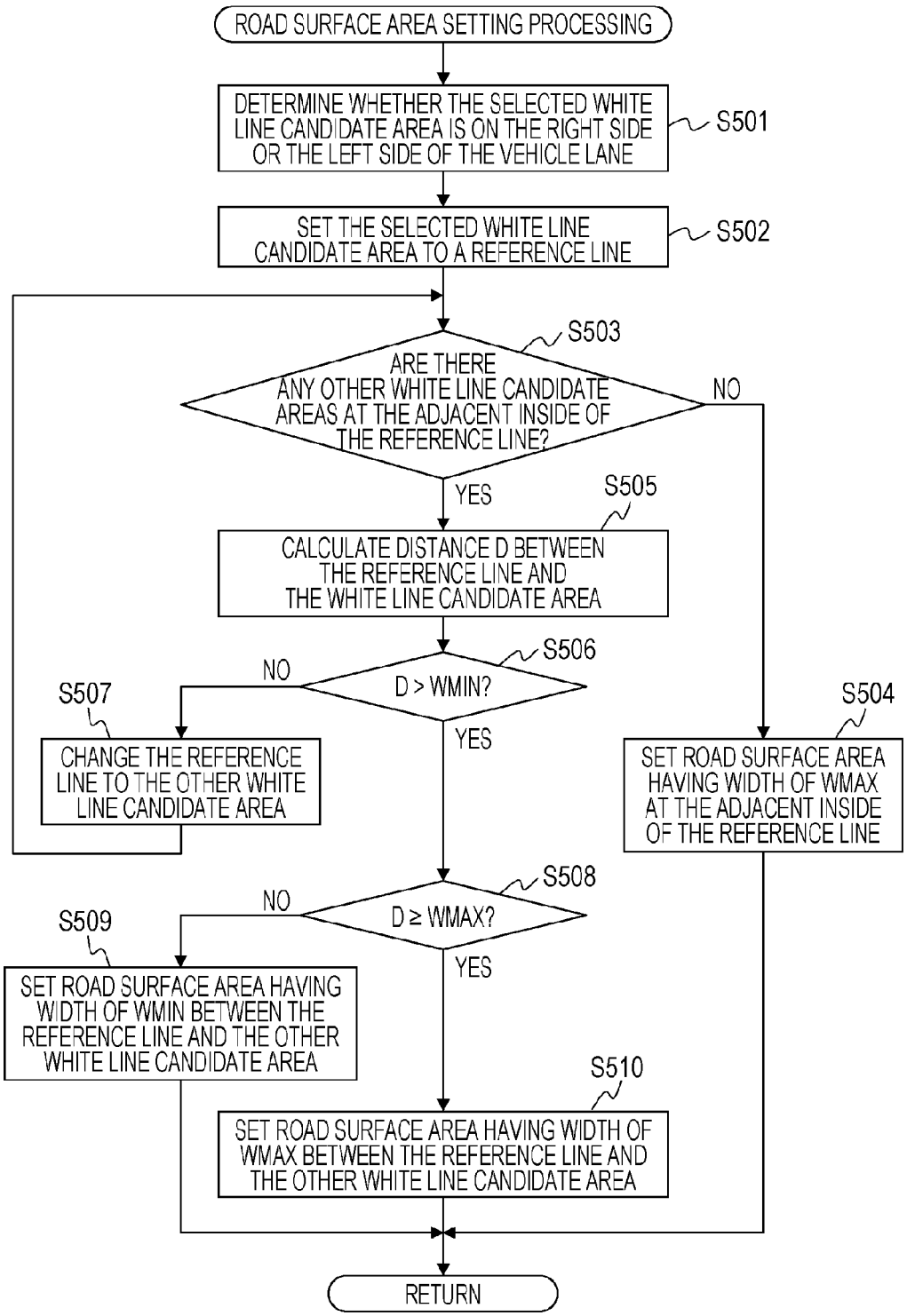
FIG. 3 is a flowchart illustrating a procedure of the road surface area setting processing in FIG. 2.

FIG. 2 is a flowchart illustrating a procedure of traffic lane boundary line extraction processing. FIG. 3 is a flowchart illustrating a procedure of the road surface area setting processing in FIG. 2.

In the traffic lane boundary line extraction apparatus 1, when a traffic lane boundary line (white line area) is extracted from vehicle outside image data, first, vehicle outside image data is obtained as illustrated in FIG. 2 (step S1). The vehicle outside image acquisition unit 2 obtains the vehicle outside image data. In this regard, the vehicle outside image data obtained in step S1 is not limited to an image including a road surface of the front side of the vehicle in the vehicle travelling direction, but also may be an image including a road surface of the rear side of the vehicle in the vehicle travelling direction.

Next, a search is made of the vehicle outside image data for a white line candidate area (step S2). If a white line candidate area is detected, a position and a size of the detected white line candidate area are identified. The processing of step S2 is performed by the white line candidate area detection unit 3. As described later, the white line candidate area detection unit 3 detects all the areas that have the same characteristics as the characteristics of a traffic lane boundary line in the vehicle outside image data regardless of whether the area is a traffic lane boundary line or not.

As a result of the processing of step S2, if a white line candidate area has not been detected (step S3; NO), the extraction processing on the vehicle outside image data obtained in step S1 is terminated.

On the other hand, as a result of the processing of step S2, if a white line candidate area has been detected (step S3; YES), the processing for verifying whether the detected white line candidate area is suitable for a traffic lane boundary line or not is performed (step S4 to S10).

If a white line candidate area has been detected (step S3; YES), one of the white line candidate areas to be verified is selected from the detected white line candidate area (step S4). The processing of step S4 is performed by the right or left position determination unit 4a in the road surface area setting unit 4. If the number of the detected white line candidate areas is one, the right or left position determination unit 4a automatically selects the white line candidate area. On the other hand, if the number of the detected white line candidate area is plural, the right or left position determination unit 4a selects a white line candidate area in accordance with the predetermined selection rule. For the selection rule, an example of selecting a white line candidate area, not verified yet, located at the leftmost side in the vehicle outside image data, or the like is given.

Next, road surface area setting processing for setting a road surface area on the selected white line candidate area is performed (step S5). The processing of step S5 is performed by the road surface area setting unit 4. In the processing of step S5, as illustrated in FIG. 3, first, a determination is made of whether the selected white line candidate area is on the right side or the left side of the traffic lane (step S501). The processing of step S501 is performed by the right or left position determination unit 4a in the road surface area setting unit 4. The right or left position determination unit 4a determines whether the selected white line candidate area is located on the right side or the left side of the traffic lane in which the vehicle that has captured the vehicle outside image data is running from the position of the white line candidate area in the vehicle outside image data.

Next, the selected white line candidate area is set to a reference line for setting a road surface area (step S502). The processing of step S502 is performed by the right or left position determination unit 4a or the neighboring white line candidate area confirmation unit 4b.

Next, a confirmation is made of whether there are any other white line candidate areas adjacent inside of the reference line (step S503). If there are no other white line candidate areas (step S503; NO), a road surface area having a width of WMAX is set on the adjacent inside of the reference line (step S504). In this regard, in the first embodiment, it is assumed that the road surface area is rectangular, and the width of the road surface area is the size of the reference line in a normal direction (the width direction of the traffic lane). Also, the width WMAX is one (a second threshold value) of the initial threshold values 8a stored in the storage unit 8. The determination of step S503 is performed by the neighboring white line candidate area confirmation unit 4b, and the processing of step S504 is performed by the road surface area size determination unit 4c.

On the other hand, if there are white line candidate areas on the adjacent inside of the reference line (step S503; YES), next, a distance D between the reference line and the other white line candidate area is calculated (step S505). Then, a comparison is made between the calculated distance D and a predetermined first threshold value WMIN (step S506). If the distance D is equal to or less than the first threshold value WMIN (step S506; NO), the reference line is changed to another white line candidate area located at the adjacent inside (step S507), and the processing returns to step S503. The first threshold value WMIN is one of the initial threshold values 8a stored in the storage unit 8, and is a positive value less than the second threshold value WMAX. The processing of steps S505 to S507 is performed by the neighboring white line candidate area confirmation unit 4b.

Also, if the distance D is greater than the first threshold value WMIN (step S506; YES), next a comparison is made between the distance D and the predetermined second threshold value WMAX (step S508). In this regard, the second threshold value WMAX is a higher value than the first threshold value WMIN as described above.

If the distance D is less than the second threshold value WMAX (step S508; NO), a road surface area having the width WMIN is set between the reference line and the other white line candidate area (step S509). On the other hand, if the distance D is equal to or greater than the second threshold value WMAX (step S508; YES), a road surface area having the width WMAX is set between the reference line and the other white line candidate area (step S510). The determination of step S508 is performed by the neighboring white line candidate area confirmation unit 4b, and the processing of the steps S509 and S510 are performed by the road surface area size determination unit 4c.

When a road surface area is set by the processing of step S504, S509, or S510 described above, the road surface area setting processing (that is to say, the processing of step S5 in FIG. 2) illustrated in FIG. 3 is terminated.

When the road surface area setting processing (step S5) is completed, as illustrated in FIG. 2, next, a luminance VR of the set road surface area is calculated (step S6), and a luminance VL of the selected white line candidate area is calculated (step S7). The processing of step S6 is performed by the road surface area luminance calculation unit 5a in the luminance calculation unit 5, and the processing of step S7 is performed by the white line candidate area luminance calculation unit 5b in the luminance calculation unit 5.

In the processing of step S6, for example noise components in the luminance values of the pixels in a road surface area is removed, and then the average value of the luminance values is determined to be a representative luminance (luminance VR). In this regard, in the processing of step S6, for example, a luminance histogram on the pixels in a road surface area is calculated, and a luminance having the largest number of pixels may be determined as a representative luminance (luminance VR) of the road surface area. On the other hand, in the processing of step S7, for example in consideration of the characteristics of a contour enhancement filter specific to an imaging apparatus, the average luminance of the pixels of an area inside from a contour of the white line candidate area by a predetermined the number of pixels is calculated as a representative luminance (luminance VL). In the processing in steps S6 and S7, a gray scale value of each pixel is used as a luminance value. For example, if it is assumed that the obtained vehicle outside image has monochrome 256 gray scales, the gray scale value of black having the lowest luminance becomes 0, the gray scale value of white having the highest luminance becomes 255, and the gray scale value of each pixel becomes a numeric value between 0 and 255. In the processing in steps S6 and S7, the average value of the gray scale values of the pixels in the individual areas, or a gray scale value having the largest number of pixels in the histogram is determined to be a representative luminance of each area.

Next, the difference (VL−VR) between the luminance VL of the white candidate area and the luminance VR of the road surface area is calculated, and a comparison is made between the calculated difference (VL−VR) and a predetermined third threshold value TH (step S8). The third threshold value TH is one of the initial threshold values 8a stored in the storage unit 8, and is a minimum difference in luminance that a traffic lane boundary line has to have for the background of the road surface. If a vehicle outside image to be obtained has a monochrome 256 gray scale, and the road surface is an asphalt pavement, the third threshold value TH is determined to be about a value of 15 to 20, for example. If the calculated difference (VL=VR) is higher than the third threshold value TH (step S8; YES), the white line candidate area selected in step S4 is extracted as a white line area and held (step S9). On the other hand, if the calculated difference (VL−VR) is equal to or less than the third threshold value TH (step S8; NO), the selected white line candidate area is deleted in step S4 (step S10). The processing of step S8 to S10 is performed by the white line candidate area evaluation unit 6. At this time, the white line candidate area evaluation unit 6 stores the luminance data of the white line area extracted in step S9, and the luminance data of the road surface area are stored in the storage unit 8 as the past processing result 8*b*.

In this regard, the third threshold value TH is not limited to a specific value stored in the storage unit 8 as one of the initial threshold values 8*a*. A value calculated based on the luminance data of the white line area and the luminance data of the road surface area, which was stored as a past processing result 8*b*, may be used for the third threshold value TH. In that case, the third threshold value TH is produced, for example by calculating a luminance histogram from the luminance data of the white line area, and the luminance data of the road surface area, and then by performing statistical processing on the luminance histogram.

After the verification of step S5 to S10 is performed on the white line candidate area selected in step S4 as described above, if there are unverified white line candidate areas (step S11; YES), the processing returns to step S4, and verification on unverified white line candidate area is carried out. Then, if verification on all the white line candidate areas is completed, the extraction processing of a traffic lane boundary line from the vehicle outside image data obtained in step S1 is completed. When the extraction processing of a traffic lane boundary line is completed in this manner, the traffic lane boundary line extraction apparatus 1 associates the white line area data including the positional information of the extracted white line area with the vehicle outside image data, and outputs them to the outside of the traffic lane boundary line extraction apparatus 1 from the extraction result output unit 7. Thereby, the extraction processing of a traffic lane boundary line from the obtained vehicle outside image data is completed.

In this regard, when each time the traffic lane boundary line extraction apparatus 1 obtains vehicle outside image data by the vehicle outside image acquisition unit 2, the processing of steps S2 to S11 in FIG. 2 is performed.

In the following, a description will be given of a specific example of the traffic lane boundary line extraction processing illustrated in FIG. 2 and FIG. 3 in comparison with a related-art extraction method.

Figure 4A:
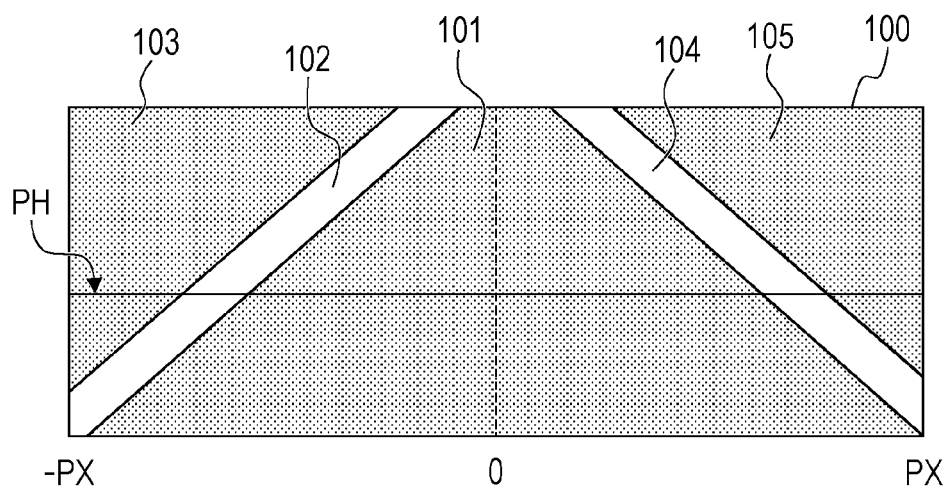
FIGS. 4A and 4B are schematic diagrams illustrating a detection method of a white line candidate area.
Figure 4B:
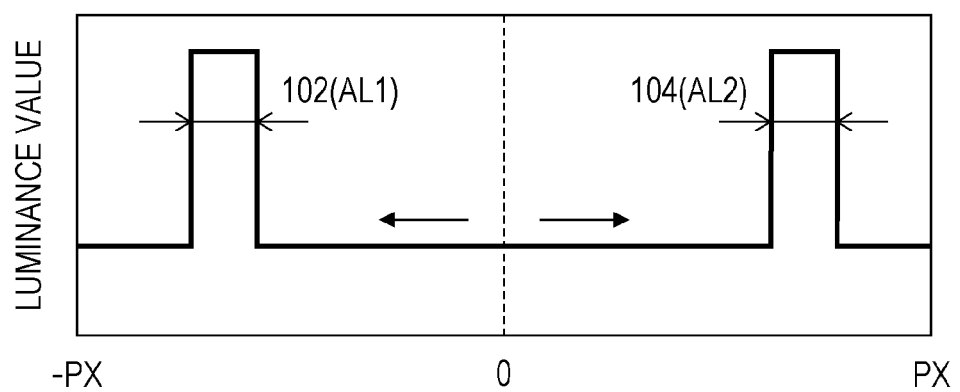

FIGS. 4A and 4B are schematic diagrams illustrating a detection method of a white line candidate area. In this regard, FIG. 4A is an example of a vehicle outside image, and FIG. 4B is a graph illustrating a luminance value of each pixel in a pixel line PH in the vehicle outside image illustrated in FIG. 4A.

The vehicle outside image data obtained by the traffic lane boundary line extraction apparatus 1 is image data of the outside of the vehicle that is captured in the vehicle travelling direction including a road surface as described above. As illustrated in FIG. 4A, a sub-image 100 of a road surface part in the vehicle outside image includes a lane 101 in which the vehicle is running, traffic lane boundary lines (white lines) 102 and 104, and outside lane areas 103 and 105. When a white line candidate area is detected from such a sub-image 100, a change pattern in luminance is used. For example, in the case of an asphalt-paved road surface, the road surface (asphalt) is exposed in the lane 101, and the outside lane areas 103 and 105. On the other hand, the traffic lane boundary lines 102 and 104 are provided with white paint on the road surface, or the like. Accordingly, when luminance values of individual pixels are examined in the pixel line PH in the horizontal direction in a sub-image 100, as illustrated in FIG. 4B, the luminance values in sections corresponding to the traffic lane boundary lines 102 and 104 become higher than the luminance values in the lane 101 and the outside lane areas 103 and 105. Accordingly, when luminance values of individual pixels of the sub-image 100 are checked in the horizontal direction from a center position (0) to the left end (−PX) of the sub-image 100, the luminance value suddenly increases at the boundary between the lane 101 and the traffic lane boundary line 102, and suddenly decreases at the boundary between the traffic lane boundary line 102 and the outside lane area 103. In the same manner, when luminance values of individual pixels of the sub-image 100 are checked in the horizontal direction from a center position (0) to the right end (PX) of the sub-image 100, the luminance value suddenly increases at the boundary between the lane 101 and the traffic lane boundary line 104, and suddenly decreases at the boundary between the traffic lane boundary line 104 and the outside lane area 105. From this fact, it is said that a section having high luminance values locally in the pixels disposed in the horizontal direction has a high possibility of being a traffic lane boundary line. Accordingly, the traffic lane boundary lines 102 and 104 are detected from the sub-image 100 illustrated in FIG. 4A as white line candidate areas AL1 and AL2, respectively.

Also, it is possible to calculate the width of the traffic lane boundary line 102 in the sub-image 100 from the width (about 15 cm) of a traffic lane boundary line on a road surface in an actual environment, and the angle of view and the resolution of the imaging apparatus that has captured the sub-image 100, and the like. Accordingly, if the luminance values of the pixels disposed in the horizontal direction are locally high, and a section of the high luminance values has a width close to the width of the traffic lane boundary line 102, it is very likely that the section is a traffic lane boundary line. Accordingly, in the traffic lane boundary line extraction apparatus 1 (the white line candidate area detection unit 3), for example, all the areas having high luminance values locally, and having sections of the high luminance have a width close to a predetermined width of the lane boundary line 102 are detected as white line candidate areas.

More specifically, first by edge detection processing using a Laplacian Of Gaussian (LOG) filter, and the like, for example, the boundary between the lane 101 and the traffic lane boundary lines 102 and 104, or the like is calculated, and labeling is applied to the calculated edge information. After that, noise components are removed in consideration of the directions and the shapes of line segments, and the like, and link processing is performed in order to extract line elements that are continued in the vehicle travelling direction. Then, among the areas that are located between the extracted line elements, areas that satisfy the conditions, such as the above-described luminance change pattern, the width of the traffic lane boundary lines 102 and 104, and the like are detected as white line candidate areas AL1 and AL2.

When a white line candidate area is detected in this manner, next, a road surface area is set in order to verify whether the white line candidate area is suitable for a traffic lane boundary line or not.

Figure 5:
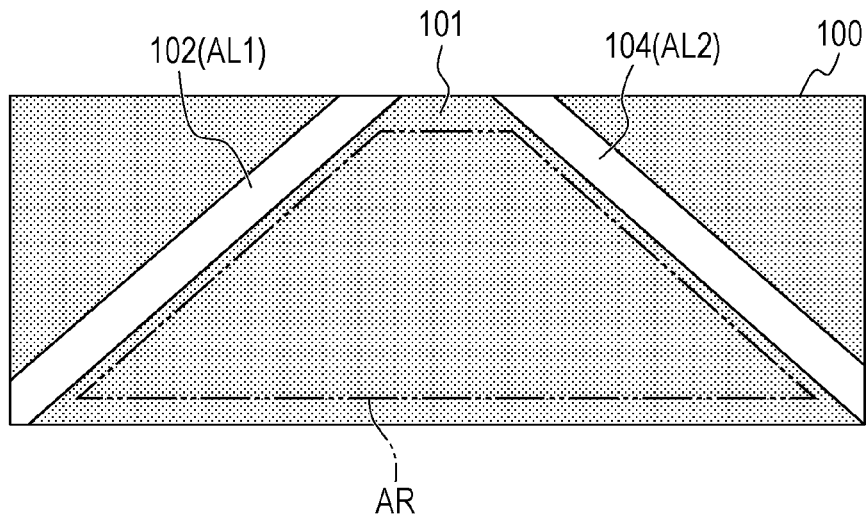
FIG. 5 is a schematic diagram illustrating a related-art method of setting a road surface area, and the problems thereof.

FIG. 5 is a schematic diagram illustrating a related-art method of setting a road surface area, and the problems thereof.

When a road surface area is set for the detected white line candidate area, in a related-art setting method, as illustrated in FIG. 5, one road surface area AR is set between the white line candidate area AL1 located on the left side of the lane 101, and the white line candidate area AL2 located on the right side. At this time, as the sub-image 100 illustrated in FIG. 5, if the entire surface of the lane 101 is an exposed surface of a background of the road surface (for example, asphalt), the luminance of the road surface area AR becomes the same as or nearly equal to the luminance of the background. Accordingly, in the case of comparing the luminance of the white line candidate area AL1 with that of the road surface area AR, and in the case of comparing the luminance of the white line candidate area AL2 with that of the road surface area, the difference in luminance becomes large in both of the cases. Accordingly, it is possible to recognize that the white line candidate areas AL1 and AL2 are suitable for traffic lane boundary lines (white line areas).

However, the lane 101 is sometimes provided with a road sign (road surface sign), for example, numeric values of a speed limit, and the like. The road sign is provided by the same white paint as that of the traffic lane boundary line, and the like, and thus the luminance of the road sign is higher than that of the background of the road surface. Accordingly, if there is a road sign in the set road surface area AR, the luminance of the road surface area AR becomes higher than the luminance of the background. In this case, when a comparison is made between the luminance of the white line candidate areas AL1 and AL2, and the luminance of the road surface area AR, the difference in luminance becomes smaller than the case of comparing the road surface luminance calculated based on only the background. Accordingly, the white line candidate areas AL1 and AL2 might be recognized to be unsuitable for traffic lane boundary lines (white line areas).

Also, for example, if a building and the like casts a shadow on only the white line candidate area AL1 and its vicinity, even if there are no road signs in the road surface area AR, the difference in luminance between the white line candidate area AL1 and the road surface area AR becomes small. Accordingly, the white line candidate area AL1 might be recognized to be unsuitable for a traffic lane boundary line (white line area).

Further, in a related-art setting method, the white line candidate area AL1 located on the left side of the lane 101, and the white line candidate area AL2 located on the right side are combined into a pair, and one road surface area AR is set between the one pair of white line candidate areas AL1 and AL2. Accordingly, if a traffic lane boundary line is located on only either one of the left side and the right side of the lane 101, it is not possible to set a road surface area.

In contrast, in the traffic lane boundary line extraction apparatus 1 according to the first embodiment, as described above, a road surface area corresponding to the white line candidate area is set for each of the detected white line candidate areas.

Figure 6:
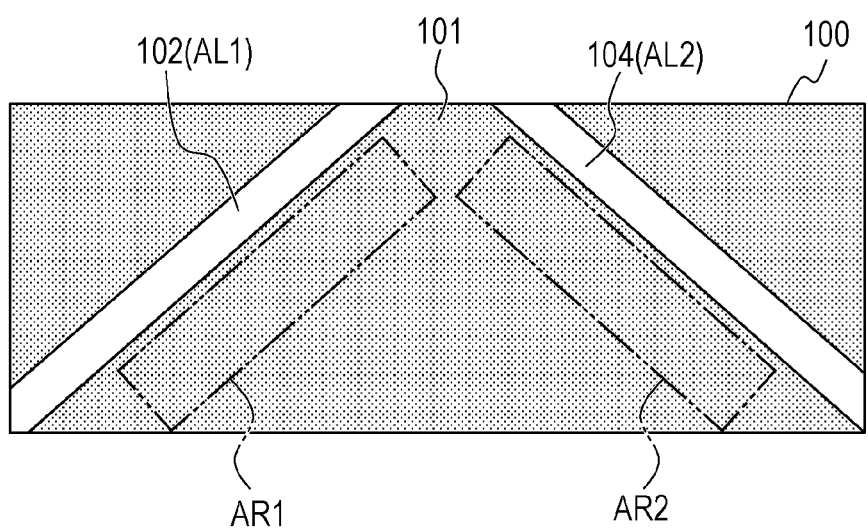
FIG. 6 is a schematic diagram illustrating one of the features of a method of setting a road surface area according to the first embodiment.

FIG. 6 is a schematic diagram illustrating one of the features of a method of setting a road surface area, according to the first embodiment.

In the method of setting a road surface area, according to the first embodiment, as illustrated in FIG. 6, a road surface area AR1 is set for the white line candidate area AL1 located on the left side of the lane 101, and a road surface area AR2 is set for the white line candidate area AL2 located on the right side of the lane 101. At this time, the road surface areas AR1 and AR2 are set inside (on the vehicle side) the corresponding white line candidate areas AL1 and AL2, respectively. Also, the road surface areas AR1 and AR2 are locally set in the vicinity of the white line candidate areas AL1 and AL2, respectively so as not to include the road signs of the lane 101. Thereby, an increase in luminance of the road surface areas AR1 and AR2 compared with the luminance of the background is avoided, and a decrease in the difference in luminance between the white line candidate areas AL1 and AL2 and the road surface areas AR1 and AR2 is avoided. Also, for example, if a building and the like casts shadows on white line candidate area AL1, the shadow is often cast on the road surface area AR1. Accordingly, a decrease in luminance by the shadow occurs in the white line candidate area AL1 and in the road surface area AR1, and thus the relative difference between the luminance of the white line candidate area AL1 and the luminance of the road surface area AR1 is maintained. Accordingly, it is possible to avoid a decrease of the difference in luminance between the white line candidate area AL1 and the road surface area AR, which is caused by the shadow.

In this manner, in the road surface area setting method according to the first embodiment, it is possible to avoid a decrease of the difference in luminance between the white line candidate area AL1 and the road surface area AR, which is caused by road signs of the lane 101, and shadows. Accordingly, it is possible to avoid recognizing that the white line candidate areas AL1 and AL2 are unsuitable for traffic lane boundary lines (white line areas).

Also, by setting the road surface areas AR1 and AR2 inside (the vehicle side) of the white line candidate areas AL1 and AL2, even if the outside lane areas 103 and 105 are narrow, it is possible to set the road surface areas AR1 and AR2 having a size that allows calculation of stable luminance.

Further, although not illustrated in the diagram, a road surface area is set for each white line candidate area, for example, even if the detected white line candidate area is located only on one end of the lane 101, it is possible to set a road surface area, and to recognize whether the detected white line candidate area is suitable for a traffic lane boundary line or not.

Figure 7A:
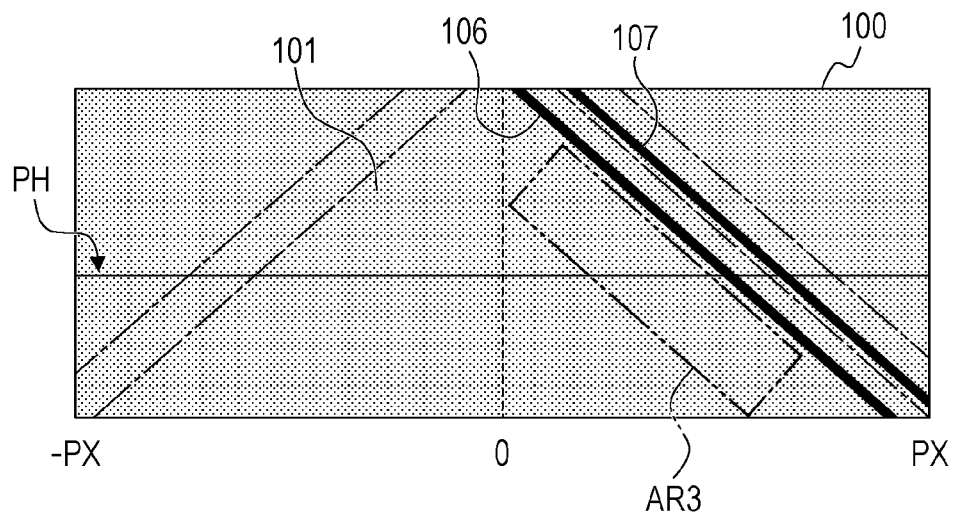
FIGS. 7A and 7B are schematic diagrams illustrating another one of the features of the method of setting a road surface area according to the first embodiment.
Figure 7B:
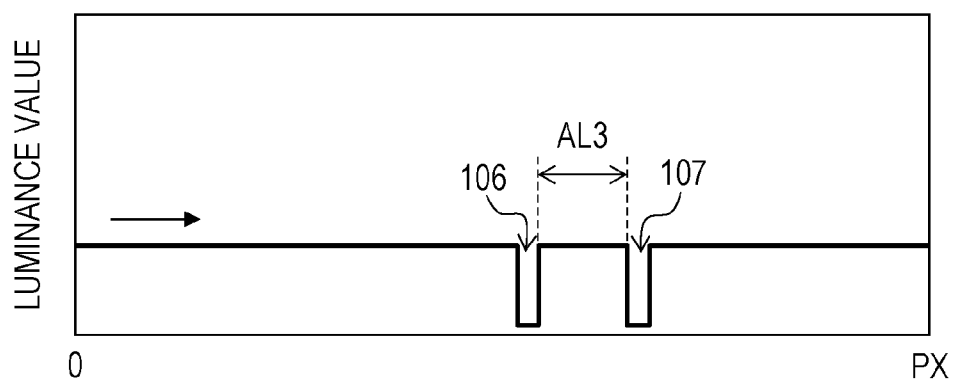

FIGS. 7A and 7B are schematic diagrams illustrating the other one of the features of the method of setting a road surface area according to the first embodiment. In this regard, FIG. 7A is an example of the vehicle outside image having no traffic lane boundary lines, and FIG. 7B is a graph illustrating the luminance value of each pixel in a pixel line PH of the vehicle outside image illustrated in FIG. 7A. Also, in FIG. 7B, only the luminance value in the right side area from the center position (O) in FIG. 7A is illustrated.

A road surface on which a vehicle runs sometimes has no traffic lane boundary lines. However, when a vehicle outside image including a road surface having no traffic lane boundary lines is obtained, for example, as illustrated in FIG. 7A, the end part of the lane 101 in the sub-image 100 sometimes includes the shadows 106 and 107 of power lines. In this manner, if the shadows 106 and 107 of the power lines are included, the luminance value of each pixel in a pixel line PH in the sub-image 100 becomes as illustrated in FIG. 7B. That is to say, the luminance values of sections corresponding to the shadows 106 and 107 of the power lines becomes lower than the luminance value of the background of the road surface. Accordingly, if a white line candidate area is detected based on the change pattern of the luminance, an area located between the shadows 106 and 107 of the power lines are sometimes detected as a white line candidate area AL3. In this manner, if the area located between the shadows 106 and 107 of the power lines are detected as the white line candidate area AL3, a road surface area AR3 is set for the white line candidate area AL3. At this time, since the white line candidate area AL3 and the road surface area AR3 are both the background of the road surface, the luminance of the white line candidate area AL3 and the luminance of the road surface area AR3 becomes the same or substantially the same. Thus, the difference between the luminance of the white line candidate area AL3 and the luminance of the road surface area AR3 becomes 0 or a very small value. Accordingly, as illustrated in FIG. 2, if the difference between the luminance of the white line candidate area and the luminance of the road surface area is less than the predetermined third threshold value TH, the white line candidate area is deleted so that it is possible to delete the white line candidate area AL3 that is not suitable for a traffic lane boundary line. In this regard, the third threshold value TH ought to be a value that allows reliably deleting the white line candidate area AL3 corresponding to the background of the road surface as described above, and that allows reliably extracting the white line candidate area corresponding to a traffic lane boundary line. The third threshold value TH is also allowed to be suitably changed.

Figure 8A:
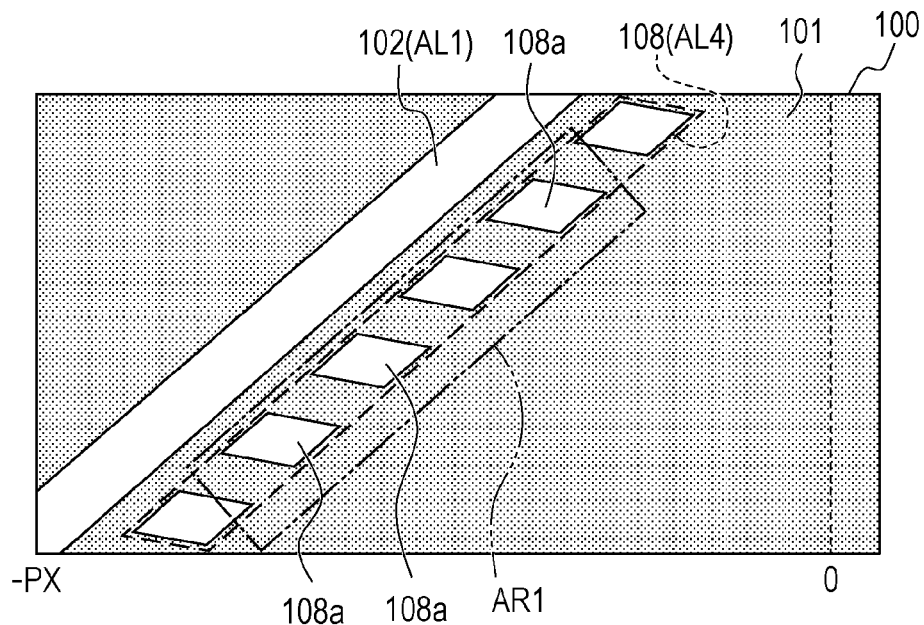
FIGS. 8A and 8B are schematic diagrams illustrating still another one of the features of the method of setting a road surface area according to the first embodiment.
Figure 8B:
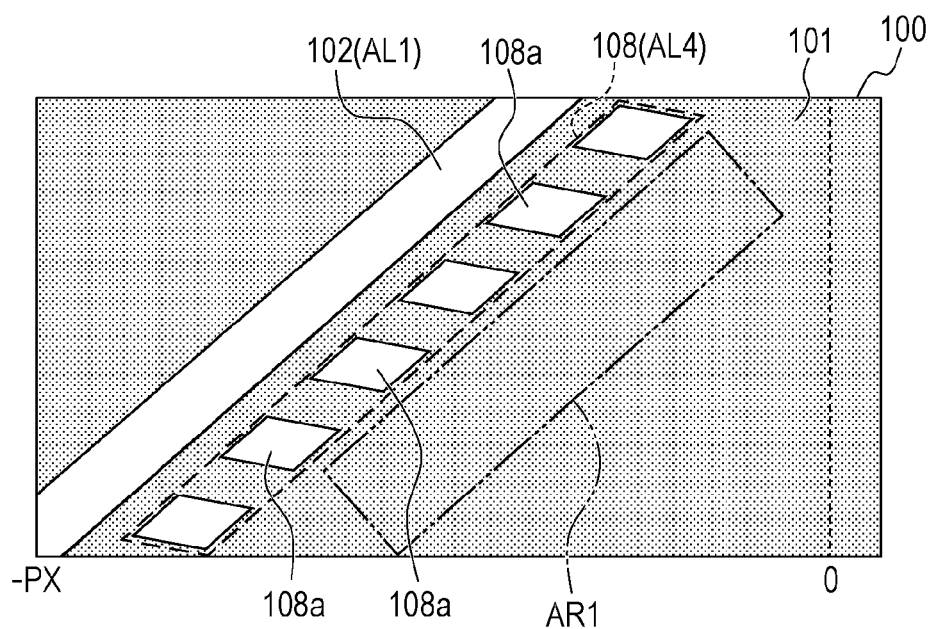

FIGS. 8A and 8B are schematic diagrams illustrating still another one of the features of the method of setting a road surface area according to the first embodiment. In this regard, FIG. 8A is an example of a vehicle outside image in which another white line candidate area is located at the adjacent inside of the white line candidate area, and FIG. 8B is an example of setting a road surface area corresponding to the white line candidate area AL1.

A road surface on which a vehicle runs is sometimes provided with a plurality of traffic lane boundary lines (multiple lines) on one side of the traffic lane. That is to say, as illustrated in FIG. 8A, in a sub-image 100 of the obtained vehicle outside image, a solid-line traffic lane boundary line 102 and a broken-line white line 108 are sometimes located on the left side of the lane 101. When a white line candidate area is detected from such a sub-image, a white line candidate area AL1 corresponding to the traffic lane boundary line 102, and a white line candidate area AL4 corresponding to the broken-line white line 108 are detected. At this time, if a road surface area AR1 corresponding to the white line candidate area AL1 is set at the adjacent inside of the white line candidate area 1 as illustrated in FIG. 8A, white line elements 108a in the broken-line white line 108 are included in the road surface area AR1. Accordingly, when the luminance of the road surface area AR1 is calculated, the luminance becomes higher than the luminance of the background of the road surface, and thus the difference in luminance between the white line candidate area AL1 and the road surface area AR1 becomes small.

Thus, in the road surface area setting method according to the first embodiment, as illustrated in FIG. 8B, if another white line candidate area AL4 is located at the adjacent inside of the white line candidate area AL1 (the reference line) for which a road surface area AR1 is to be set, a road surface area AR1 is set at an inner side of the other white line candidate area AL4. That is to say, the road surface area AR1 for the white line candidate area AL1 is set at a position where the other white line candidate area AL4 is not included. Thereby, it is possible to avoid increasing in luminance of the road surface area AR1 higher than the luminance of the background, and to avoid recognizing that the white line candidate area AL1 is unsuitable for a traffic lane boundary line (white line area).

In this regard, in the road surface area setting method according to the first embodiment, if another white line candidate area is located inside the white line candidate area, as illustrated in FIG. 3, the setting position and the size (width) of the road surface area for the white line candidate area is determined in accordance with the distance D between the white line candidate area and the white line candidate area.

Figure 9A:
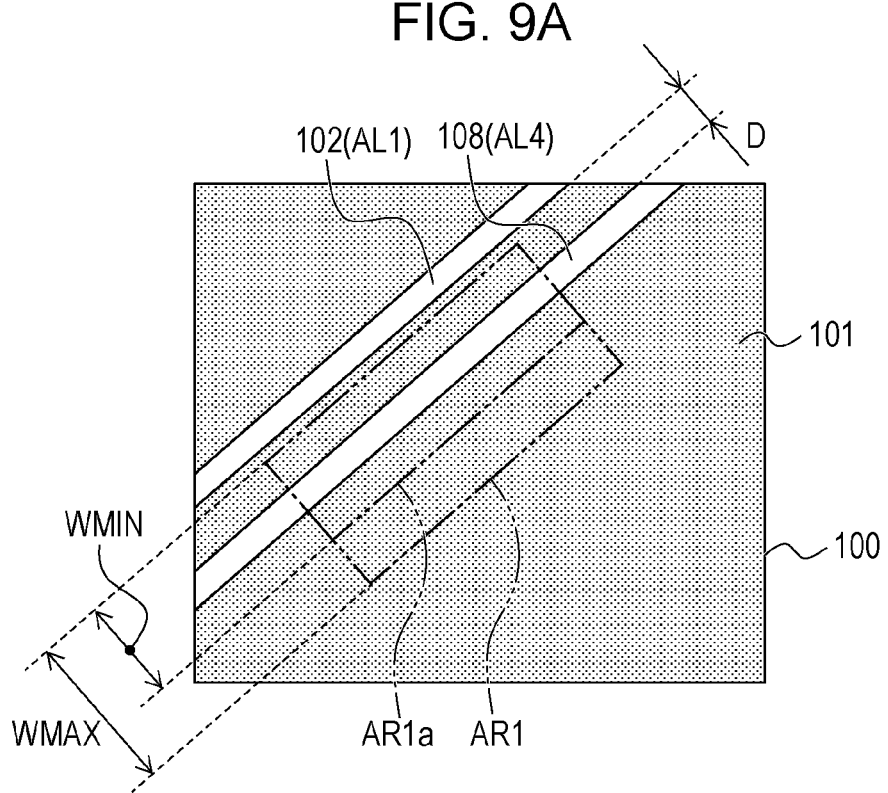
FIGS. 9A and 9B are schematic diagrams illustrating the processing of step S507 in FIG. 3.
Figure 9B:
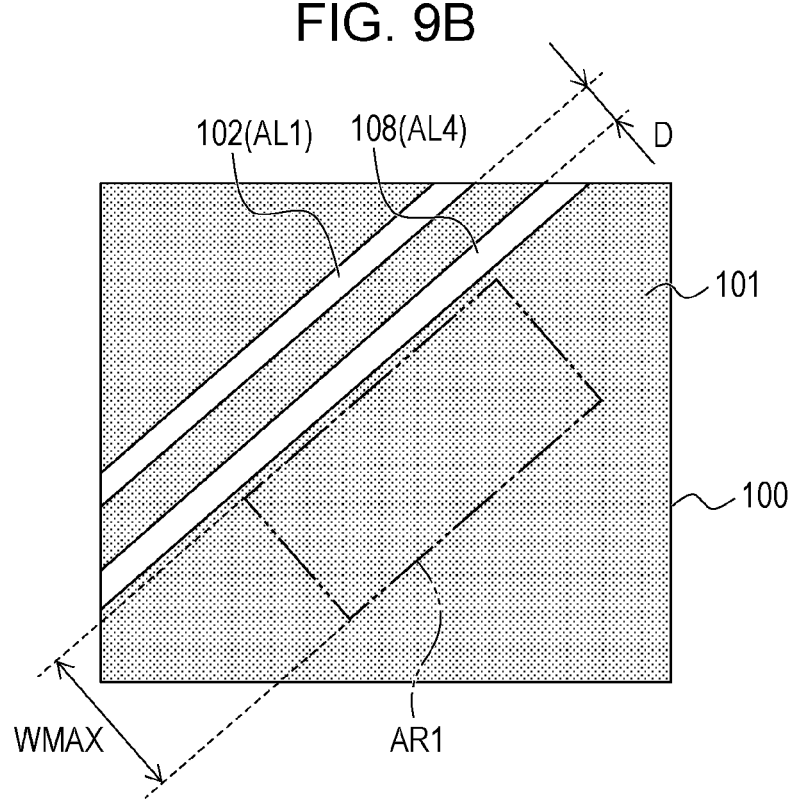

FIGS. 9A and 9B are schematic diagrams illustrating the processing of step S507 in FIG. 3. In this regard, FIG. 9A is an example of the sub-image 100 having a distance D of a white line candidate area, which is smaller than the first threshold value WMIN, and FIG. 9B is an example of a road surface area AR1 set for the white line candidate area AL1.

The processing of step S507 in FIG. 3 is performed if the distance D between the white line candidate area (reference line) to which the road surface area is to be set, and another white line candidate area is equal to or less than the first threshold value WMIN (step S506; NO). That is to say, when the distance D between the white line candidate area AL1 in the sub-image 100 and the white line candidate area AL4, and the first threshold value WMIN has the relationship as illustrated in FIG. 9A, the processing of step S507 is performed. If a rectangular area AR1a having a width of the first threshold value WMIN is set at the adjacent inside of the white line candidate area AL1, the white line candidate area AL4 is included in the rectangular area AR1a. Here, the first threshold value WMIN having the width of the rectangular area AR1a is set to a value that allows correct calculation of the luminance of the road surface area, and the smallest value possible, for example, a value corresponding to about 10 cm, which is the distance between the traffic lane boundary line 102 and the broken-line white line 108 in an actual environment. In this case, if a road surface area AR1 is set at the adjacent inside of the white line candidate area AL1, the white line candidate area AL4 is included in the road surface area AR1, and thus it is not possible to correctly calculate the luminance of the road surface area AR1. Accordingly, if the distance D between the white line candidate area AL1 and the white line candidate area AL4 is smaller than the first threshold value WMIN, the reference line for setting the road surface area AR1 is changed to the white line candidate area AL4 (step S507). In the sub-image 100 illustrated in FIG. 9A, no other white line candidate areas are located inside the white line candidate area AL4. Accordingly, after the processing of step S507 is performed, the processing is returned to step S503, and the processing of step S504 is performed. That is to say, the road surface area AR1 corresponding to the white line candidate area AL1 is set with the white line candidate area AL4 as a reference line, and as illustrated in FIG. 9B, the road surface area AR1 is set at the adjacent inside of the white line candidate area AL4. At this time, the width of the road surface area AR1 is determined to be the second threshold value WMAX. The second threshold value WMAX is set to about a value that allows correct calculation of the luminance of the road surface area, and not including road signs of the lane 101, and thus a value in the range not exceeding the center of the width direction of the lane 101, for example a few times the first threshold value WMIN, or the like.

Also, although not illustrated in the diagram, when a road surface area is set for the white line candidate area AL4, another white line candidate area is not located inside the white line candidate area AL4, and thus the road surface area is set using the white line candidate area AL4 as a reference line. This road surface area is set to have the same position and the same size (width WMAX) as those of the road surface area AR1 for the white line candidate area AL1.

Figure 10A:
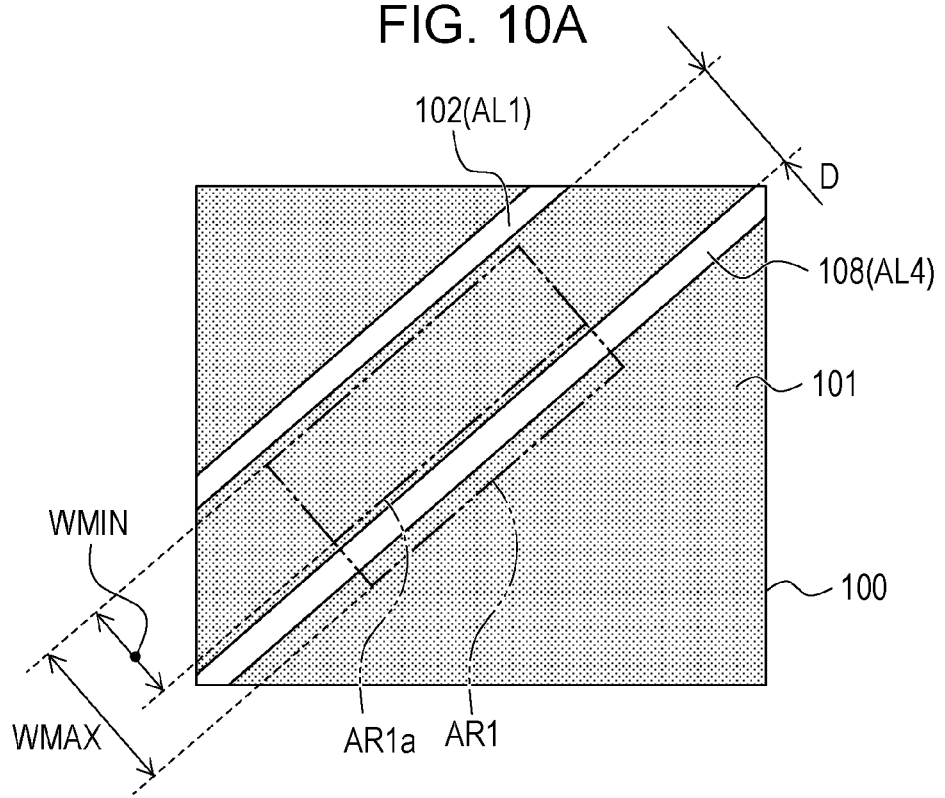
FIGS. 10A and 10B are schematic diagrams illustrating the processing of step S509 in FIG. 3.
Figure 10B:
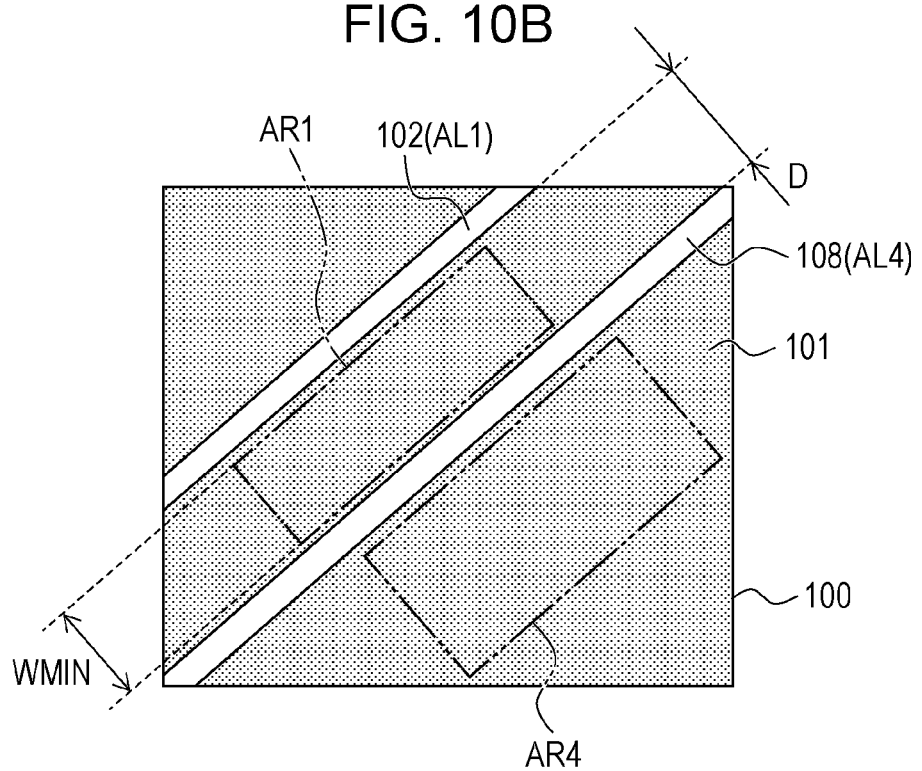

FIGS. 10A and 10B are schematic diagrams illustrating the processing of step S509 in FIG. 3. In this regard, FIG. 10A is an example of a sub-image 100, in which the distance D of the white line candidate area is greater than the first threshold value WMIN, and is less than the second threshold value WMAX. FIG. 10B is an example of the road surface areas AR1 and AR4 set for the white line candidate areas AL1 and AL4, respectively.

The step S509 in FIG. 3 is performed when the distance D between the white line candidate area (reference line) to which a road surface area is set and the other white line candidate area is greater than the first threshold value WMIN (step S506; YES), and the distance D is smaller than the second threshold value WMAX (step S508; NO). That is to say, when the relationship between the distance D between the white line candidate area AL1 and the white line candidate area AL4 in the sub-image 100, and the first threshold value WMIN and the second threshold value WMAX is as illustrated in FIG. 10A, the processing of step S509 is performed. At this time, if a rectangular area AR1a having a width of the first threshold value WMIN is set at the adjacent inside of the white line candidate area AL1, the white line candidate area AL4 is not included in the rectangular area AR1a. The first threshold value WMIN is set to a value that allows the luminance of the road surface area to be correctly calculated, and the smallest value possible (for example, a value corresponding to about 10 cm in an actual environment) as described above. Accordingly, as illustrated in FIG. 10B, it is possible to determine the rectangular area AR1a that is allowed to be set between the white line candidate area AL1 and the white line candidate area AL4 to be a candidate area AR1 for the white line candidate area AL1. Thereby, it is possible to avoid setting the candidate area AR1 at a position away from the white line candidate area AL1, and to avoid a decrease of the difference in luminance between the white line candidate area AL1 and the candidate area AR1, which is caused by the shadow of a building or the like.

Also, when the road surface area AR4 for the white line candidate area AL4 is set, there are no other white line candidate areas inside the white line candidate area AL4, and thus the road surface area AR4 is set at the adjacent inside of the white line candidate area AL4. This road surface area AR4 is determined to have a width of the second threshold value WMAX in order to calculate the luminance more correctly.

Figure 11A:
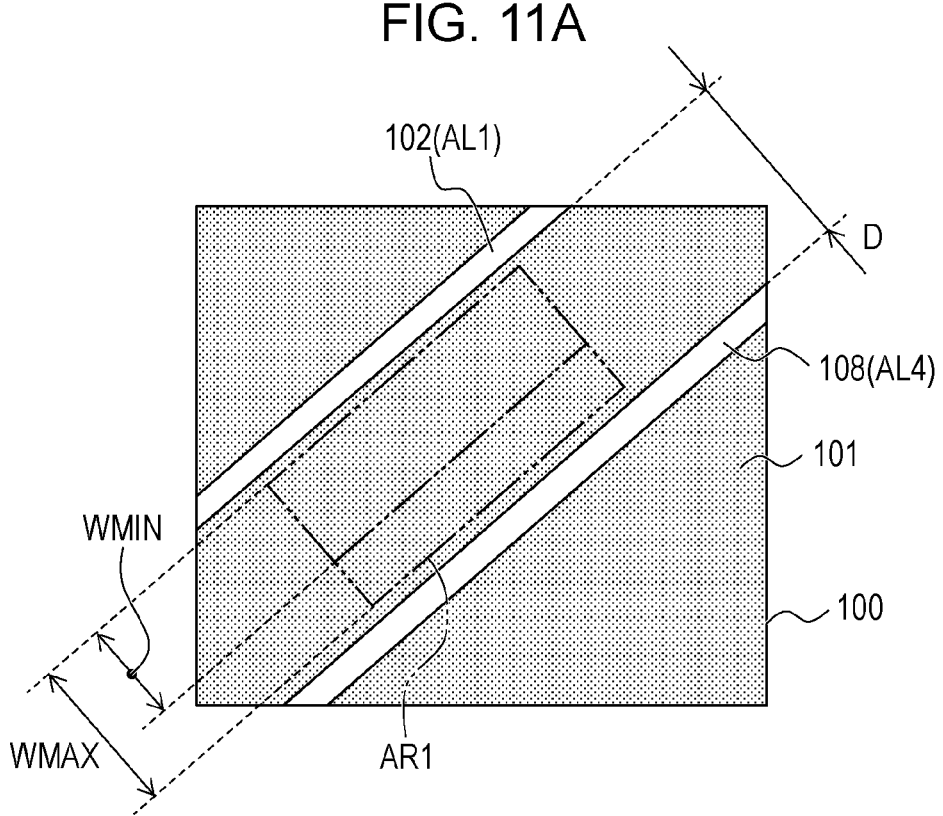
FIGS. 11A and 11B are schematic diagrams illustrating the processing of step S510 in FIG. 3.
Figure 11B:
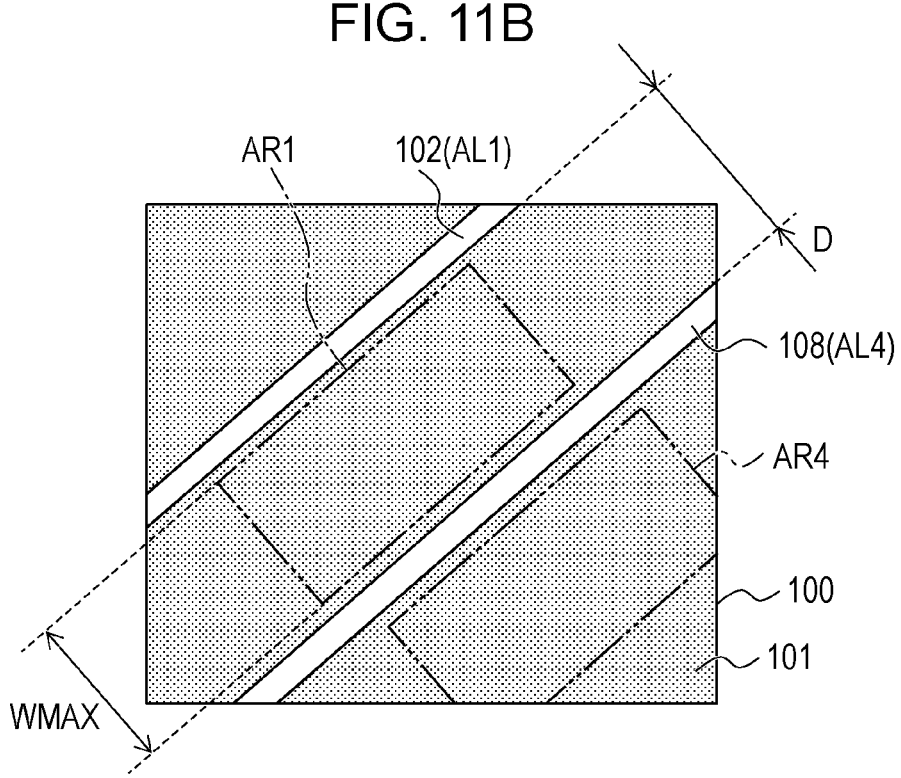

FIGS. 11A and 11B are schematic diagrams illustrating the processing of step S510 in FIG. 3. In this regard, FIG. 11A is an example of a sub-image 100 in which the distance D of the white line candidate area is equal to or larger than the second threshold value WMAX, and FIG. 11B is an example of the road surface area AR1 set for the white line candidate area AL1.

The step S510 in FIG. 3 is performed when the distance D between the white line candidate area (reference line) to which a road surface area is set and the other white line candidate area is equal to or larger than the second threshold value WMAX (step S508; YES). That is to say, when the distance D between the white line candidate area AL1 and the white line candidate area AL4 in the sub-image 100, and the first threshold value WMIN, and the second threshold value WMAX have a relationship illustrated in FIG. 11A, the processing of step S510 is performed. At this time, if the road surface area AR1 having a width of the second threshold value WMAX is set on the adjacent inside of the white line candidate area AL1, another white line candidate area is not included in the road surface area AR1. Accordingly, as illustrated in FIG. 11B, it is possible to set the road surface area AR1 having the width WMAX between the white line candidate area AL1 and the white line candidate area AL4. Thereby, it is possible to avoid setting the candidate area AR1 at a position away from the white line candidate area AL1, and to avoid a decrease of the difference in luminance between the white line candidate area AL1 and the candidate area AR1, which is caused by the shadow of a building or the like.

Also, when the road surface area AR4 for the white line candidate area AL4 is set, there are no other white line candidate areas inside the white line candidate area AL4, and thus the road surface area AR4 is set at the adjacent inside of the white line candidate area AL4. This road surface area AR4 is also determined to have a width of the second threshold value WMAX in order to calculate the luminance more correctly.

As described above, in the traffic lane boundary line extraction apparatus and the extraction method according to the first embodiment, a road surface area is set for each detected white line candidate area, and thus when a white line candidate area is located only on one side of the traffic lane in which a vehicle is running, it is possible to set a road surface area. Accordingly, when a white line candidate area is located only one side of a traffic lane, it is possible to recognize whether the white line candidate area is suitable for a traffic lane boundary line.

Also, evaluation of the white line candidate area is performed by whether the difference between the luminance of the white line candidate area, and the luminance of the road surface area is larger than the predetermined third threshold value TH or not. If the white candidate area corresponds to a traffic lane boundary line (white line), the luminance of the white line candidate area becomes higher than the luminance of the road surface area. On the other hand, if the white line candidate area is the background (for example, an area surrounded by the shadows of power lines) of the road surface, the luminance of the white line candidate area becomes substantially equal to the luminance of the road surface area. Accordingly, if the difference between the luminance of the white line candidate area and the luminance of the road surface area is larger than the third threshold value TH, the white line candidate area is recognized to be suitable for the traffic lane boundary line, and thereby it is possible to reliably extract a traffic lane boundary line that is located only on one side of the traffic lane. Also, a white line candidate area, such as the background of the road surface surrounded by the shadows of power lines, is recognized to be unsuitable for a traffic lane boundary line, and thus it is possible to delete the white line candidate area. Accordingly, with the traffic lane boundary line extraction apparatus according to the first embodiment, it is possible to extract a traffic lane boundary line from vehicle outside image data with high precision.

Further, in the traffic lane boundary line extraction apparatus and the extraction method according to first embodiment, when a road surface area is set for the selected white line candidate area, setting is carried out such that another candidate area is not included. Accordingly, it is possible to avoid increasing the luminance of the road surface area calculated by the luminance calculation unit 5 (the luminance calculation unit 5a in the road surface area) higher than the luminance of the background of the road surface. Accordingly, it is possible to avoid decreasing the difference between the luminance of the white line candidate area corresponding to the traffic lane boundary line and the luminance of the road surface area lower than the actual difference, and thus to avoid deletion of the white line candidate area corresponding to the traffic lane boundary line.

Moreover, in the traffic lane boundary line extraction apparatus and the extraction method according to the first embodiment, a road surface area is locally set at the adjacent inside (the vehicle side) of the white line candidate area. The inside of the white line candidate area is a traffic lane on which a vehicle runs, and thus an area that is the background of a road surface is reliably located there. Also, the inside of a white line candidate area in a vehicle outside image has a wider area in which a road surface area is allowed to be set compared with the outside (on the opposite side of the vehicle side) of the white line candidate area. Accordingly, a road surface area is set on the vehicle side of the white line candidate area so that the road surface area is allowed to have a size (width) capable of ensuring reliability of the luminance of the road surface area. Also, the setting position of the road surface area is determined based on the distance between the candidate area and the other candidate area, and thus a road surface area is allowed to be set in the vicinity of the white candidate area in a state of ensuring the reliability if the luminance of the road surface area. Accordingly, it is possible to reduce the difference in brightness between the white candidate area and the road surface area. For example, it is possible to avoid a situation in which a building casts a shadow only on a white line candidate area on a fine day, and thus the difference between the luminance of the white line candidate area and the luminance of the road surface area becomes small. Accordingly, it is possible to reduce variations of the extraction precision a traffic lane boundary line, which is caused by weather and time zone.

In this regard, in the first embodiment, a road surface area is determined to be a rectangle. However, the shape of a road surface area is not limited to this, and may be a parallelogram, a trapezoid, or the like. In that case, a first threshold value WMIN and a second threshold value WMAX ought to be set with reference to the size of a normal direction of the reference line in a road surface area in each shape, and the road surface area setting processing illustrated in FIG. 3 ought to be performed.

Also, in the first embodiment, as illustrated in FIG. 3, the width of a road surface area is set to the first threshold value WMIN or the second threshold value WMAX in accordance with the distance D between the reference line (the white line candidate area) and another white line candidate area. However, the width of a road surface area is not limited to this, and only the first threshold value WMIN may be fixed. In that case, the processing steps S508 to S510 is replaced by one piece of processing to set a road surface area having the width WMIN between the reference line and the other white line candidate area, and in step S504, the road surface area having the width WMIN at the adjacent inside of the reference line. In this manner, the road surface area setting processing is simplified, and the processing time is shortened.

Also, the traffic lane boundary line extraction apparatus 1 according to the first embodiment may be achieved by combining pieces of hardware having the functions corresponding to the functional blocks of the vehicle outside image acquisition unit 2, the white line candidate area detection unit 3, and the like, respectively as illustrated in FIG. 1, or by executing a program on a computer. In the case of executing a program on a computer, a program describing the processing (instructions) illustrated in FIG. 2 and FIG. 3 ought to be installed in a computer through a portable recording medium, such as an optical disc, a memory card, or the like, or a network, such as the Internet, or the like, and then the program ought to be executed.

Second Embodiment

Figure 12:
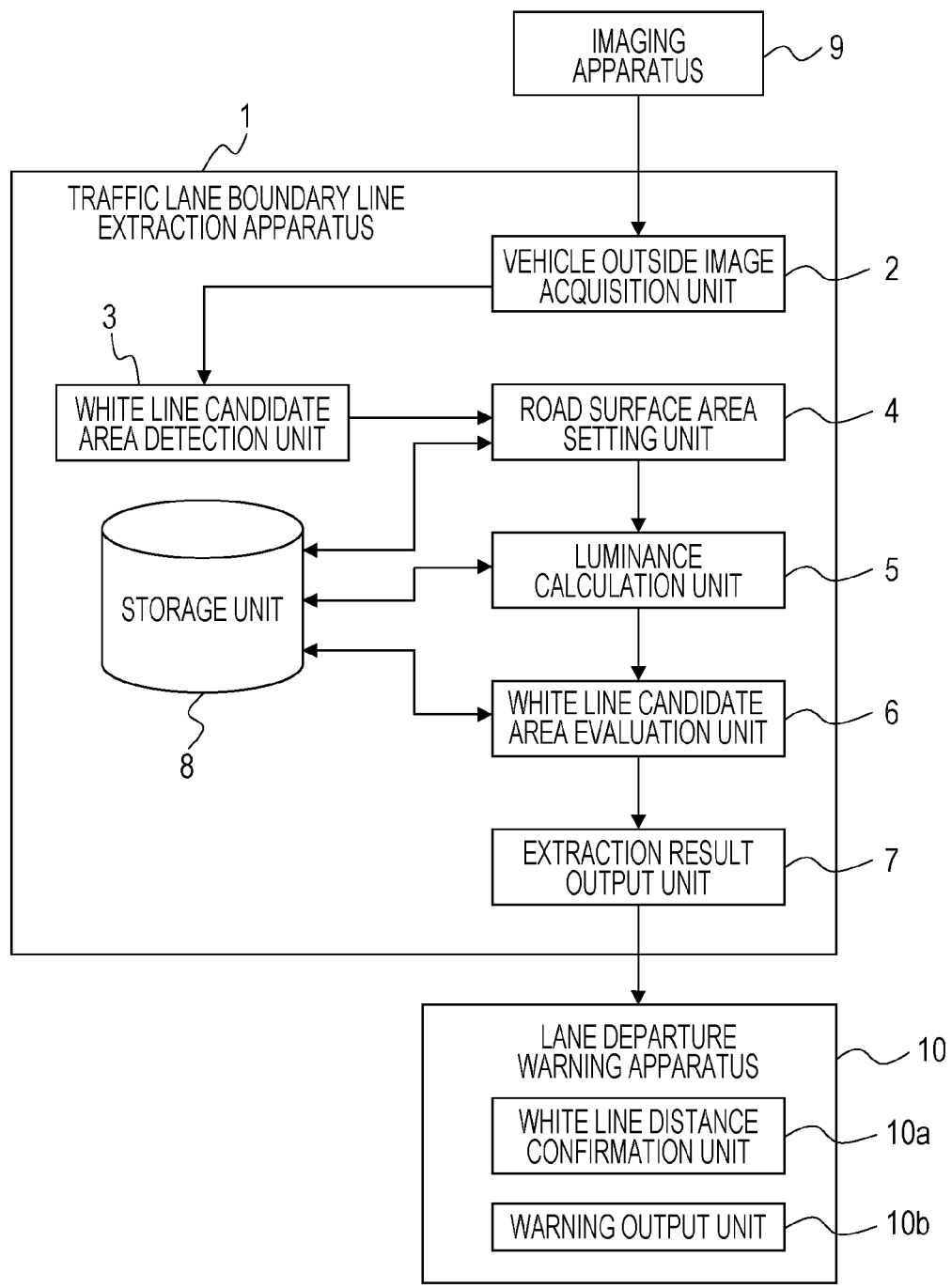
FIG. 12 is a functional block diagram illustrating a configuration of a lane departure warning system according to a second embodiment of the present disclosure.

FIG. 12 is a functional block diagram illustrating a configuration of a lane departure warning system according to a second embodiment of the present disclosure.

The lane departure warning system according to the second embodiment is a system that is mounted on a vehicle, and issues a warning if a running vehicle is about to depart from a traffic lane without intentional operation by a driver. As illustrated in FIG. 12, the lane departure warning system includes an imaging apparatus 9, a traffic lane boundary line extraction apparatus 1, and a lane departure warning apparatus 10. The imaging apparatus 9 is a digital camera using a solid-state imaging device, such as a charge coupled device (CCD), or the like, and captures a vehicle outside image on the front side in the vehicle travelling direction or on the rear side. For this imaging apparatus 9, it is possible to use a camera included in a drive recorder or a car navigation system.

As described in the first embodiment, the traffic lane boundary line extraction apparatus 1 includes the vehicle outside image acquisition unit 2, the white line candidate area detection unit 3, the road surface area setting unit 4, the luminance calculation unit 5, the white line candidate area evaluation unit 6, the extraction result output unit 7, and the storage unit 8.

The lane departure warning apparatus 10 includes a white line distance confirmation unit 10a, and a warning output unit 10b. The white line distance confirmation unit 10a confirms the distance between the traffic lane boundary line and the vehicle itself based on the positional information, and the like of the traffic lane boundary line (white line area) that has been extracted from the vehicle outside image by the traffic lane boundary line extraction apparatus 1. The warning output unit 10b issues a warning when the distance between the traffic lane boundary line and the vehicle itself becomes less than a predetermined threshold value, and intentional operation by a driver, such as operation of a direction indicator, or the like is not performed.

In such a lane departure warning system, it is desirable to extract a traffic lane boundary line of a vehicle outside image with high precision from the viewpoint of avoiding false warning, and the like. The traffic lane boundary line extraction apparatus 1 used in a lane departure warning system according to the second embodiment allows improvement in the extraction precision of a traffic lane boundary line as described in the first embodiment. Accordingly, it is possible for the lane departure warning system according to the second embodiment to reduce false warning, which is caused by false detection of a traffic lane boundary line (white line area) or the like, and thus to improve reliability.

In this regard, the lane departure warning system according to the second embodiment may be configured to work together with a lane departure prevention support system, for example which generates force to bring back the vehicle in the traffic lane when the vehicle is about to depart from a traffic lane.

Third Embodiment

Figure 13:
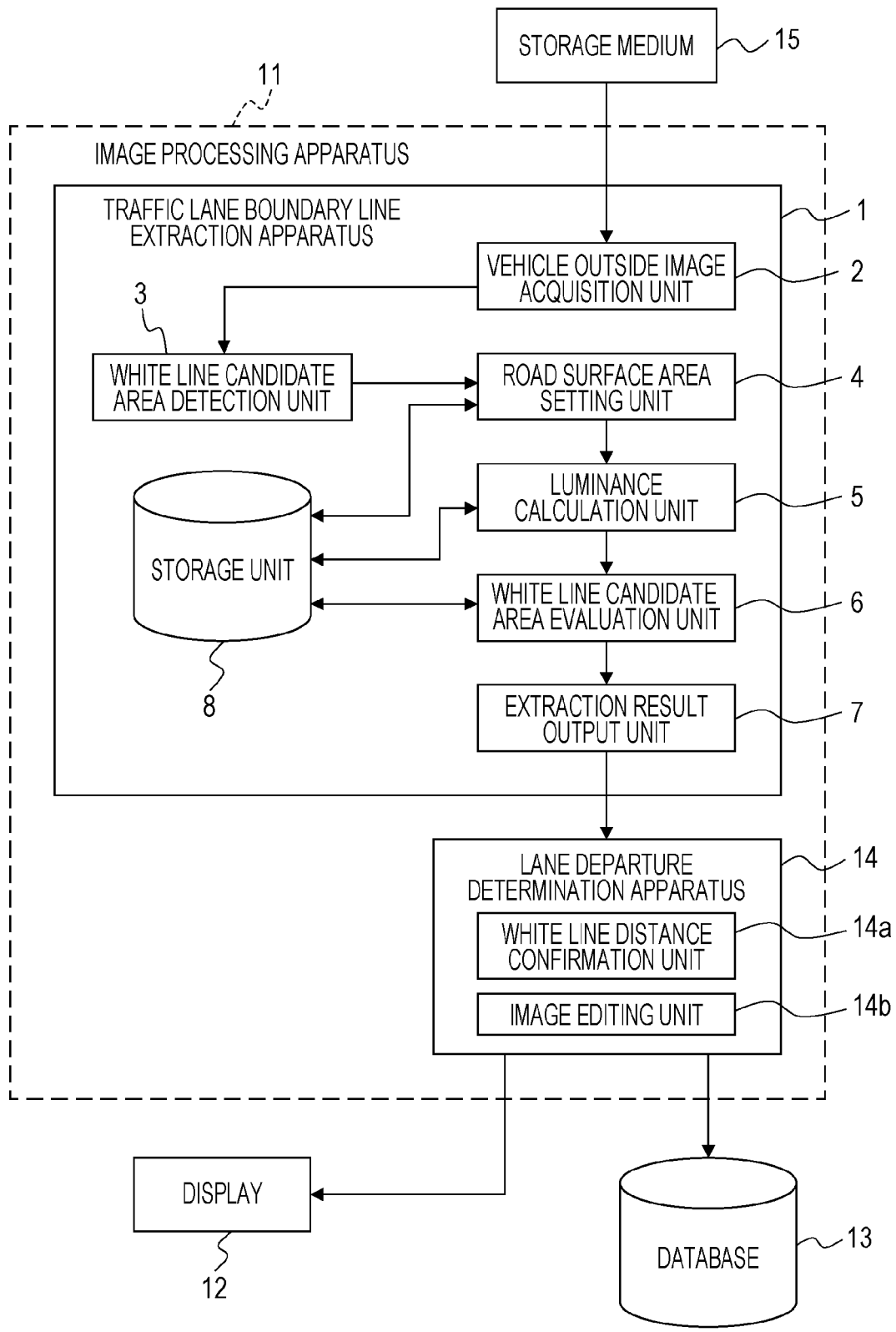
FIG. 13 is a functional block diagram illustrating a configuration of a driving record management system according to a third embodiment of the present disclosure.

FIG. 13 is a functional block diagram illustrating a configuration of a driving record management system according to a third embodiment of the present disclosure.

The driving record management system according to the third embodiment is a system in which a vehicle outside image captured and stored by an imaging apparatus is subjected to offline processing, that is to say, subjected to processing by an apparatus other than an apparatus mounted on a vehicle, and is managed as a driving record. As illustrated in FIG. 13, the driving record management system includes an image processing apparatus 11, a display 12, and a database 13.

The image processing apparatus 11 is an apparatus including a traffic lane boundary line extraction apparatus 1, and a traffic lane departure determination apparatus 14, and is achieved by a computer executing a program, for example. In this regard, a vehicle outside image acquisition unit 2 in the traffic lane boundary line extraction apparatus 1 according to the third embodiment reads and obtains the vehicle outside image data stored in a recording medium 15. The recording medium 15 is, for example a semiconductor memory, such as a memory card, or the like, or a hard disk drive, or the like included in a drive recorder, or a car navigation system. For example, in the case where the recording medium 15 is a memory card, the recording medium 15 is inserted into a predetermined slot of the image processing apparatus 11, and the vehicle outside image data is read out. In the case where the recording medium 15 is a hard disk drive included in a drive recorder, or the like, the vehicle outside image data is read by wired communication using a Universal Serial Bus (USB) cable, or the like, or near field communication, such as Bluetooth (a registered trademark), or the like. The traffic lane boundary line extraction apparatus 1 extracts and outputs a traffic lane boundary line by the procedure illustrated in FIG. 2 and FIG. 3 using the vehicle outside image data read out from the recording medium 15.

The traffic lane departure determination apparatus 14 includes a white line distance confirmation unit 14a, and an image editing unit 14b. The white line distance confirmation unit 14a confirms the distance between the traffic lane boundary line and the vehicle based on the positional information of a traffic lane boundary line (white line area) extracted by the traffic lane boundary line extraction apparatus 1 from a vehicle outside image, and the like. The image editing unit 14b adds information indicating that departure from a traffic lane is likely to occur to the scene in the vehicle outside image if there is a scene at which the distance between the traffic lane boundary line and the vehicle becomes less than a predetermined threshold value.

The display 12 is a liquid crystal display, for example, and displays vehicle outside image data having been processed by the image processing apparatus 11.

The database 13 stores the processing result in the image processing apparatus 11.

It is possible for the driving record management system like this to extract individual traffic lane boundary lines for each of the vehicle outside images captured by a plurality of vehicles to determine whether there are scenes in which departure from traffic lanes might occur or not, and to store the determination results into the database. Accordingly, it is possible to use the driving record management system according to the third embodiment for evaluating driver's skills, and the like, for example.

In this regard, the driving record management system according to the third embodiment is not limited to the configuration illustrated in FIG. 13, and is allowed to be suitably changed, as a matter of course. For example, the image processing apparatus 11, and the display 12 may be installed at each sales office of a transport company, and each of the image processing apparatuses 11 and the database 13 installed at a management center of a transport company may be connected through a network, such as the Internet, or the like. Also, the image processing apparatus 11, the display 12, and the database 13 may be installed at a management center of a transport company, and a terminal (computer) and the image processing apparatus 11, which are installed at each sales office of the transport company, may be connected through a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A traffic lane boundary line extraction apparatus comprising:
   a memory; and
   a processor coupled to the memory and configured to:
      acquire vehicle outside image data captured by a travelling vehicle;
      detect a candidate area of a traffic lane boundary line from a road surface part of the vehicle outside image data;
      set a road surface area corresponding to the candidate area in the road surface part of the vehicle outside image data for each of the candidate area;
      calculate a representative luminance of the candidate area, and calculate a representative luminance of the road surface area;
      when a difference between the representative luminance of the candidate area and the representative luminance of the road surface area is greater than a predetermined threshold value, extract the candidate area as the traffic lane boundary line and store the candidate area in the memory; and
      when a difference between the representative luminance of the candidate area and the representative luminance of the road surface area is not greater than a predetermined threshold value, discard the candidate area.

2. The traffic lane boundary line extraction apparatus according to claim 1,
   wherein the processor is further configured to
      confirm whether another candidate area exists near the candidate area, and
      set a road surface area not including the other candidate area.

3. The traffic lane boundary line extraction apparatus according to claim 2,
   wherein the processor is further configured to determine in which of a right side and a left side of the vehicle in a travelling direction of the vehicle the candidate area is located, and set the road surface area in a position located at the vehicle side of the candidate area.

4. The traffic lane boundary line extraction apparatus according to claim 2,
   wherein when the other candidate area exists near the candidate area, the processor is further configured to calculate a distance between the candidate area and the other candidate area, determine a setting position of the road surface area based on the calculated distance, and determine a width of the road surface area.

5. The traffic lane boundary line extraction apparatus according to claim 4,
   wherein when the distance between the calculated candidate area and the other candidate area is longer than a predetermined value, the processor is further configured to determine the setting position of the road surface area between the candidate area and the other candidate area, and when the distance between the calculated candidate area and the other candidate area is shorter than a first threshold value, the processor is further configured to determine the setting position of the road surface area at a position on the vehicle side of the other candidate area.

6. The traffic lane boundary line extraction apparatus according to claim 4,
wherein when the distance between the calculated candidate area and the other candidate area is longer than a first threshold value, and shorter than a second threshold value, the processor is further configured to set a road surface area having a width of the first threshold value between the candidate area and the other candidate area, when the distance between the calculated candidate area and the other candidate area is longer than the second distance, the processor is further configured to set a road surface area having a width of the second threshold value between the candidate area and the other candidate area, and when the distance between the calculated candidate area and the other candidate area is shorter than the first threshold value, the processor is further configured to set a road surface area having a width of the second threshold value at a position on a vehicle side of the other candidate area.

7. A method of extracting a traffic lane boundary line, the method comprising:
acquiring vehicle outside image data captured by a travelling vehicle;
detecting a candidate area of a traffic lane boundary line from a road surface part of the vehicle outside image data;
setting a road surface area corresponding to the candidate area in the road surface part of the vehicle outside image data for each of the candidate area;
calculating a representative luminance of the candidate area, and calculating a representative luminance of the road surface area;
when a difference between the representative luminance of the candidate area and the representative luminance of the road surface area is greater than a predetermined threshold value, extracting the candidate area as the traffic lane boundary line and storing the candidate area; and
when a difference between the representative luminance of the candidate area and the representative luminance of the road surface area is not greater than a predetermined threshold value, discarding the candidate area.

8. The method of extracting a traffic lane boundary line, according to claim 7,
wherein the setting the road surface area includes confirming whether another candidate area exists near the candidate area,
when the other candidate area exists near the candidate area, calculating a distance between the calculated candidate area and the other candidate area,
when a distance between the candidate area and the other candidate area is longer than a first threshold value, determining a setting position of the road surface area between the candidate area and the other candidate area, and when the distance between the calculated candidate area and the other candidate area is shorter than the first threshold value, determining a setting position of the road surface area at a position on a vehicle side of the other candidate area.

9. The method of extracting a traffic lane boundary line, according to claim 8,
wherein when the distance between the candidate area and the other candidate area is longer than the first threshold value, and shorter than the second threshold value, determining a width of the road surface area to be the first threshold value, and when the distance between the candidate area and the other candidate area is shorter than the first threshold value, determining a width of the road surface area to be the second threshold value.

10. A non-transitory computer-readable recording medium having stored therein a program that causes a computer to execute a process, the process comprising:
acquiring vehicle outside image data captured by a travelling vehicle;
detecting a candidate area of a traffic lane boundary line from a road surface part of the vehicle outside image data;
setting a road surface area corresponding to the candidate area in the road surface part of the vehicle outside image data for each of the candidate area;
calculating a representative luminance of the candidate area, and calculating a representative luminance of the road surface area;
when a difference between the representative luminance of the candidate area and the representative luminance of the road surface area is greater than a predetermined threshold value, extracting the candidate area as the traffic lane boundary line and storing the candidate area; and
when a difference between the representative luminance of the candidate area and the representative luminance of the road surface area is not greater than a predetermined threshold value, discarding the candidate area.

* * * * *